United States Patent [19]

Domogatsky et al.

[11] Patent Number: 4,827,767
[45] Date of Patent: May 9, 1989

[54] FLOW METER

[75] Inventors: Viktor V. Domogatsky, Moskovskaya; Boris M. Levin; Valentina F. Boiko, both of Moscow; Natalya D. Batakshova, Moskovskaya; Alexei D. Bukhonov, Gorkovskaya; Alexandr I. Kravtsov, Kaluzhskaya; Mark S. Gurevich, Moscow; Vladimir M. Filimonov; Mikhail I. Smirnov, both of Moskovskaya; Vladimir P. Seredkin, Moscow, all of U.S.S.R.

[73] Assignee: Moskovsky Institut Inzhenerov Zheleznodorozhnogo Transporta, Moscow, U.S.S.R.

[21] Appl. No.: 148,547

[22] Filed: Jan. 26, 1988

[51] Int. Cl.⁴ .............................................. G01F 3/00
[52] U.S. Cl. ..................................................... 73/253
[58] Field of Search ............................. 73/253, 259–261

[56] References Cited

U.S. PATENT DOCUMENTS 3,304,781  2/1967  Stevenson ............................. 73/253

FOREIGN PATENT DOCUMENTS 0223284  10/1986  Japan ..................................... 73/261
246100    11/1969  U.S.S.R. .
1109592   4/1968   United Kingdom .

Primary Examiner—Herbert Goldstein
Attorney, Agent, or Firm—Fleit, Jacobson, Cohn & Price

[57] ABSTRACT

A flow meter has a rotor with vanes. The rotor is mounted with sealing clearances in a casing and defines therewith a working space. The casing has fluid admission and discharge ports and recesses for accommodation of rollers. Peripheries of the rollers define with the recess surfaces and with the rotor surface other sealing clearances dividing the working space into fluid admission and discharge chambers. The rollers are made with grooves for the rotor vanes to pass therethrough. Each recess has pockets, and a sealing land is defined between the pockets. The valve of any sealing clearance ranges from 0.0005 to 0.0002 times the roller diameter.

2 Claims, 1 Drawing Sheet

FLOW METER

FIELD OF THE ART

The invention relates to devices for measuring flow of liquids and gases, i.e. working fluids, which are actuated by the flow of such fluids, and more specifically it deals with flow meters.

The invention may be most advantageously used in hydraulic systems for measuring flow and amount of liquids or gas (working fluid) within a wide range of flow, viscosity, temperature and pressure and it may be used in pumps, hydraulic motors as well as in reference meterological instruments for measuring flow and volume of fluids.

BACKGROUND OF THE INVENTION

Known in the art are flow meters (GB, B, 1109592) comprising a pair of rotors which rotate synchronously with a roller installed in a spaced relation to, and in a casing having ports for fluid admission and discharge. Surfaces of the casing, rotors and roller define a working space which is of an intricate configuration. These flow meters have a complicated kinematic system, and their casing is very hard to make; it is difficult to determine exactly the working volume of the flow meter and it is hardly possible to manufacture small-size flow meters of this type.

The provision of the two rotors results in an increased load imposed on a synchronizing device which is generally built around gears thus leading to an increase in a pressure differential across the flow meter and to a rapid wear of the synchronizing gears. All these factors limit the range of measurement within which flow can be determined with a high accuracy.

Known in the art is a flow meter (SU, A, 246100) comprising a rotor having vanes which is mounted with sealing gaps in a casing and defines a working space in the casing. The casing has ports for admission and discharge of fluid and recesses accommodating rollers which are mounted in a spaced relation thereto and which divide the working space into a fluid admission chamber and a fluid discharge chamber. The rollers have grooves for the rotor vanes to pass there-through, and the rotor is mounted for rotation in synchronism with the rollers under the action of fluid energy.

Roller rotation occurs under the conditions of a substantial viscous friction in clearances defined between the surfaces of the recesses and rollers. The friction in the clearances causes a substantial pressure differential in the working space which limits the flow measurement range.

The value of friction in the clearances, hence, pressure differential in the working space depends not only on the clearance length, but also on the clearance value δ which is not pre-set in this flow meter. In addition, leakages, hence accuracy of flow measurements also depend on the clearance value.

SUMMARY OF THE INVENTION

It is an object of the invention to provide a large range of flow measurement with a high accuracy.

This object is accomplished by that in a flow meter comprising a rotor having vanes and mounted with sealing clearances in a casing defining with the casing a working space, the casing having ports for admission and discharge of fluid and recesses accommodating identical rollers having their peripheral surfaces defining with the surface of the recesses and with the rotor surface other sealing clearances, the rollers dividing the working space into a fluid admission chamber and a fluid discharge chamber and having grooves for the rotor vanes to pass therethrough, the rotor being mounted for rotation in synchronism with the rollers under the action of fluid energy, according to the invention, each recess has pockets, with sealing lands being defined there-between, the value of any sealing clearance ranging from 0.0005 to 0.002 times the roller diameter.

It is preferred that the length of the sealing land between the pockets be within the range from 0.05 to 0.2 times the roller diameter.

This construction of the flow meter makes it possible to achieve high measurement accuracy within a wide flow measurement range and to allow flow measurements to be carried out over a wide flow range with a lower number of flow meter sizes.

BRIEF DESCRIPTION OF THE DRAWINGS

Other objects and advantages of the invention will become apparent from the following description of its specific embodiment with reference to the accompanying drawings, in which.

DETAILED DESCRIPTION OF THE INVENTION

Figure 1:
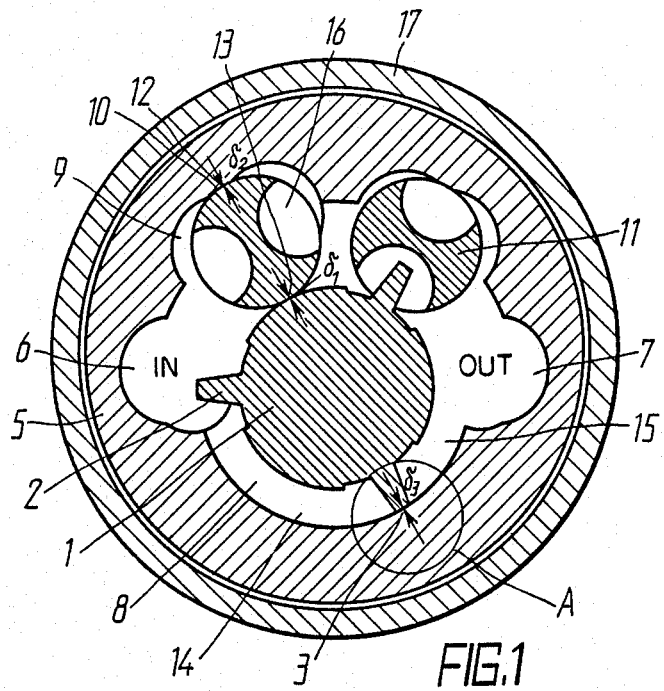
FIG. 1 shows a flow meter in a cross-section according to the invention.

A flow meter comprises a rotor 1 (FIG. 1) having vanes 2. The rotor 1 is mounted with sealing clearances 3 and 4 (FIG. 2) in a casing 5. The casing 5 has ports 6,7, (FIG. 1) for fluid admission and discharge. A working space 8 is defined by the inner surface of the casing 5 and by the periphery of the rotor 1. The casing 5 has a pair of recesses. Each recess has a pair of pockets 9, with sealing lands 10 being defined between the pockets. Identical rollers 11 are accommodated in the recesses. Sealing clearances 12 are defined between the peripheral surfaces of the rollers 11 and the sealing lands 10. Sealing surfaces 13 are defined between the peripheral surfaces of the rollers 11 and the surface of the rotor 1. The sealing clearances 3,4 (FIG. 2) 12 and 13 (FIG. 1) divide the working space 8 into a fluid admission chamber 14 and a fluid discharge chamber 15. The rollers 11 are grooved at 16 for the vanes 2 of the rotor 1 to pass therethrough. It should be noted that the length of the sealing land 10 is smaller than the length of arc between the grooves 16 as measured along the circumference of the roller 11. An optimum length of the sealing land 10 ranges from 0.05 to 0.2 times the diameter of the roller 11. The lower limit is for larger flow meter sizes and the upper limit is for smaller flow meter sizes. For larger flow meters sizes the length of the land 10 is 8 mm and it is 2 mm for smaller flow meter sizes. If the land 10 is shorter than the lower limit of 0.05 times the diameter of the roller 11, leakages of fluid will increase thus lowering accuracy of measurement, and with the land 10 longer than 0.2 times the diameter of the roller 11 the pressure differential ΔP increases thus narrowing the flow measurement range. The value of the sealing clearances 3,4,12,13 ranges from 0.0005 to 0.002 times the diameter of the roller 11, i.e. δ=(0.0005–0.002)d, wherein δ is sealing clearance 3,4,12,13;

d is the diameter of the roller 11.

Rotation of the rotor 1 is synchronized with rotation of the rollers 11. To raise the working pressure level up to 400 bars, the flow meter may be mounted in a capsule 17. For hydraulic systems working at a low working pressure level the flow meter may not be encapsulated.

The provision of the pockets 9 results in a reduction in the length of the land 10 defining the sealing clearance 12. This results in a lower viscous friction, hence in a lower pressure differential ΔP in the working space 8 thus allowing the flow measurement range to be enlarged. The provision of the clearances 3,4,12,13 ranging from 0.0005 to 0.002 times the diameter of the roller 11 ensures operability of the flow meter with minimum leakage even with low-viscosity fluids, hence with high accuracy. With the sealing clearances 3,4,12,13 smaller than 0.0005d the rotor 1 may be jammed upon a change in the fluid temperature so that the flow meter will become inoperative and with the sealing clearances 3,4,12,13 larger than 0.002d an increase in leakage will occur so as to lower accuracy of measurements.

The flow meter according to the invention functions in the following manner.

Under the action of energy of fluid admitted through the port 6 (FIG. 1) to the working space 8 the rotor 1 with the vanes 2 rotates to transfer the fluid to the port 7. During rotation of the rotor 1 the rollers 11 also rotate in synchronism therewith and one of the rollers 11 at a time lets the vane 2 through, the other roller 11, which defines the sealing clearance 12 with the land 10 of the casing 5 and the sealing clearance 13 with the surface of the rotor 1, dividing the working space 8 into the fluid admission chamber 14 and the fluid discharge chamber 15. It should be noted that the flow meter is reversible, i.e. its operation does not depend on the direction of fluid flow.

The volume of fluid that passes through the flow meter during one revolution of the rotor ($V_o$) is $$V_o = \frac{\pi}{4} (D_1^2 - D_2^2)l, \text{ cm}^3/\text{rev.},$$

wherein $D_1$ is the diameter of the vanes 2, cm; $D_2$ is the rolling diameter of the rotor 1; cm; 1 is the axial length of the vanes 2, cm.

The flow Q which is measured is $$Q = V_o n \text{ cm}^3/\text{rev.},$$

wherein n is the rotor speed, rpm.

Four sizes of flow meters with working spaces $V_o$ of 20; 100; 200; and 800 cm³/rev. were tested.

The tests were conducted on testing arrangements using liquids with a viscosity ranging from 1.5 to 100 mm²/s, the flow being varied within the range of 16:1.

Figure 3:
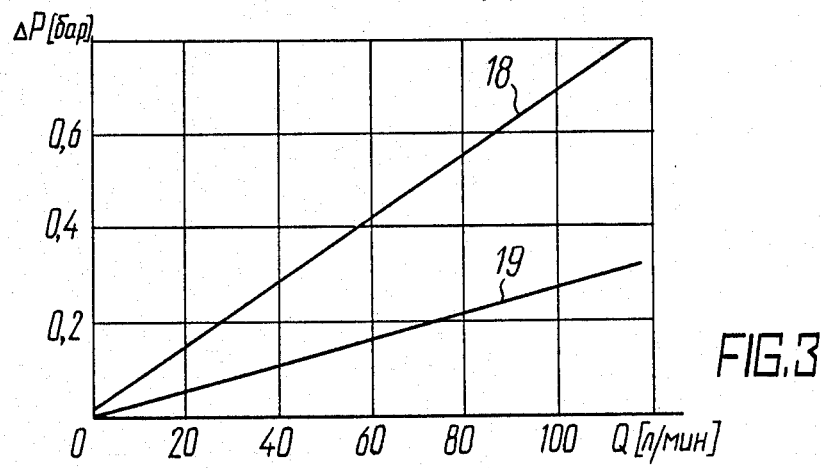
FIG. 3 is a chart showing pressure differential in the working space versus flow in a prior art flow meter and in a flow meter according to the invention.

FIG. 3 shows the results of measurements of pressure differential in the working space versus flow in a prior art flow meter - line 18 and in the flow meter according to the invention - line 19, wherein ιP is the pressure differential in the working space versus flow Q of a flow meter with $V_o=100$ cm³/rev. and with the viscosity $\nu=17$ mm²/s. As can be seen in FIG. 3, the pressure differential in the flow meter according to the invention is almost three times as low as in the prior art flow meter, whereby the measurement range is substantially enlarged.

The tests showed that the ultimate relative error within the flow measurement range of 16:1 with a viscosity of 1.5 to 20 mm²/s was from 0.24 to 0.1%, respectively, depending on the flow meter size, and the ultimate relative error was under 0.1% for all sizes with a viscosity above 20 mm²/s.

In comparison with prior art flow meters, the flow meter according to the invention ensures a wide range of flow measurements with high accuracy for various fluids such as mineral oils, synthetic liquids, diesel fuel, kerosene, ethanol, and the like. Fluid temperature may range from −40° C. to 150° C. The flow meter is noiseless in operation, it is sensitive even to drop flows and features a low inertia of moving parts. The flow meter is simple in structure and easy to manufacture; it does not call for calibration and provision of an adjustment member and ensures a pulsation-free uniform supply of fluid. The flow meter can be installed without straight cut-in piping and it does not have any counterindications (limitations) to application. No special training is required for operation of the flow meter.

What is claimed is:

1. A flow meter comprising:

a hollow casing having a cavity, provided with recesses and including an internal wall;

a rotor mounted in the cavity of said casing and having vanes;

a fluid which is flowable, filling up said casing and causing rotation of said rotor;

ports provided in said casing for admission and discharge of said fluid;

rollers accommodated in said recesses of said casing and rotating in synchronism with said rotor under the action of energy of said fluid;

grooves in said rollers for said vanes of said rotor to pass through;

sealing clearances defined between said internal wall of said casing and said rotor, the clearances ranging from 0.0005 to 0.002 times the diameter of said roller;

sealing clearances defined between said internal wall of said casing and said vanes of said rotor, the clearances ranging from 0.0005 to 0.002 times the diameter of said roller;

sealing clearances defined between surfaces of said rollers and a surface of said rotor, the clearance ranging from 0.0005 to 0.002 times the diameter of said roller;

a working space defined in the cavity of said casing by said rotor;

pockets in each of said recesses of said casing;

a sealing land defined in said internal wall of said casing between said pockets and interacting with the surface of said roller;

sealing clearances defined between said sealing land and the surface of said roller, the clearances ranging from 0.0005 to 0.002 times the diameter of said roller;

wherein said sealing clearances between said casing and said rotor as well as said sealing clearances between said sealing land and the surface of said roller divide said working space into a chamber for admission of said fluid and a chamber for discharge of said fluid.

2. A flow meter according to claim 1, wherein the length of said sealing land ranges from 0.05 to 0.2 times the diameter of said roller.

* * * * *

UNITED STATES PATENT AND TRADEMARK OFFICE
CERTIFICATE OF CORRECTION

PATENT NO. : 4,827,767
DATED : May 9, 1989
INVENTOR(S) : V. V. Domogatsky et al.

Figure 2:
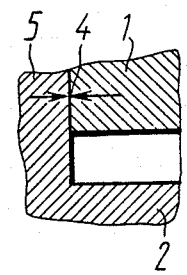
FIG. 2 is an enlarged detail A shown in its longitudinal sectional view.

It is certified that error appears in the above-identified patent and that said Letters Patent is hereby corrected as shown below:

Please replace the Figure 2 presently on file with the Figure 2 shown below:

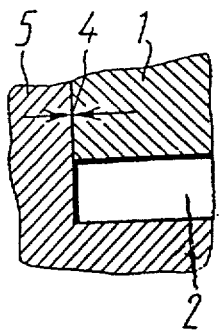

FIG.2

Signed and Sealed this

Thirtieth Day of January, 1990

*Attest:*

JEFFREY M. SAMUELS

*Attesting Officer*  *Acting Commissioner of Patents and Trademarks*